(12) United States Patent
Egerer et al.

(10) Patent No.: US 11,772,144 B2
(45) Date of Patent: Oct. 3, 2023

(54) PROCESS FOR THE PRODUCTION OF THIN-WALLED HOLLOW PROFILES WHICH ARE COMPOSED OF NONFERROUS METALS AND HAVE SMALL DIAMETERS

(71) Applicant: NEXANS, Courbevoie (FR)

(72) Inventors: Ralf Egerer, Hannover (DE); Olaf Petersen, Hannover (DE); Steven Dinkel, Hannover (DE)

(73) Assignee: NEXANS, Courbevoie (FR)

( * ) Notice: Subject to any disclaimer, the term of this patent is extended or adjusted under 35 U.S.C. 154(b) by 434 days.

(21) Appl. No.: 17/032,593

(22) Filed: Sep. 25, 2020

(65) Prior Publication Data
US 2021/0138521 A1    May 13, 2021

(30) Foreign Application Priority Data

Sep. 30, 2019    (EP) .................................... 19306241

(51) Int. Cl.
*B21C 37/08*    (2006.01)
*B23K 26/262*    (2014.01)
(Continued)

(52) U.S. Cl.
CPC ...... *B21C 37/0815* (2013.01); *B21C 37/0803* (2013.01); *B21C 37/16* (2013.01);
(Continued)

(58) Field of Classification Search
CPC ............ B21C 37/0803; B21C 37/0815; B23K 26/262; B23K 26/034; B23K 26/083;
(Continued)

(56) References Cited

U.S. PATENT DOCUMENTS 3,656,331 A * 4/1972 Kuypers ................ B21D 15/04
                                                                   72/77
5,072,870 A * 12/1991 Ziemek ................ G02B 6/4488
                                                                   228/148
(Continued)

FOREIGN PATENT DOCUMENTS

WO    WO-2018159857 A1 *    9/2018    ......... B23K 26/0608

OTHER PUBLICATIONS

International Search Report dated Apr. 2, 2020.

*Primary Examiner* — Shelley M Self
*Assistant Examiner* — Smith Oberto Bapthelus
(74) *Attorney, Agent, or Firm* — Sofer & Haroun, LLP

(57) ABSTRACT

A process is provided for the continuous production of thin-walled, radially closed hollow profiles composed of nonferrous metals and having a small cross section comprises supply of a flat strip of the metal to a forming apparatus at a first supply speed, the thickness of the strip corresponding to the wall thickness of the hollow profile. The forming apparatus continuous forms the flat strip into a shape corresponding to the hollow profile. After forming, two opposite edges of the flat strip rest flush against one another in a contact region and are continuously welded by means of a laser which emits light having a wavelength of less than 600 nm. The laser heats an area in a welding region having a diameter of less than 20% of the cross-sectional dimension of the hollow profile. The welded hollow profile is taken off from the welding region and taken up in an uptake device.

7 Claims, 3 Drawing Sheets

(51) Int. Cl.
*B23K 101/04* (2006.01)
*B21C 37/16* (2006.01)
*B23K 9/025* (2006.01)

(52) U.S. Cl.
CPC .......... *B23K 9/0253* (2013.01); *B23K 26/262* (2015.10); *B23K 2101/04* (2018.08)

(58) Field of Classification Search
CPC .... B23K 26/123; B23K 31/125; B21D 15/04; B21D 15/06; B21D 15/10; G05D 15/01
USPC .......................................................... 72/368
See application file for complete search history.

(56) References Cited

U.S. PATENT DOCUMENTS

| | | | | |
|---|---|---|---|---|
| 5,143,274 | A * | 9/1992 | Laupretre | B23K 26/262 |
| | | | | 228/148 |
| 5,376,766 | A * | 12/1994 | Higgins | B23K 13/025 |
| | | | | 219/109 |
| 5,560,536 | A * | 10/1996 | Moe | H01B 13/2633 |
| | | | | 228/148 |
| 8,941,023 | B2 * | 1/2015 | Holste | B21C 37/122 |
| | | | | 219/61 |
| 2001/0042773 | A1 | 11/2001 | Harten et al. | |
| 2001/0052511 | A1 | 12/2001 | Briand et al. | |
| 2007/0158390 | A1 * | 7/2007 | Anderson | B23K 20/023 |
| | | | | 228/101 |
| 2017/0341144 | A1 | 11/2017 | Pelaprat et al. | |
| 2018/0067085 | A1 * | 3/2018 | Ininger | G01N 29/262 |
| 2021/0138521 | A1 * | 5/2021 | Egerer | B21C 37/0803 |

\* cited by examiner

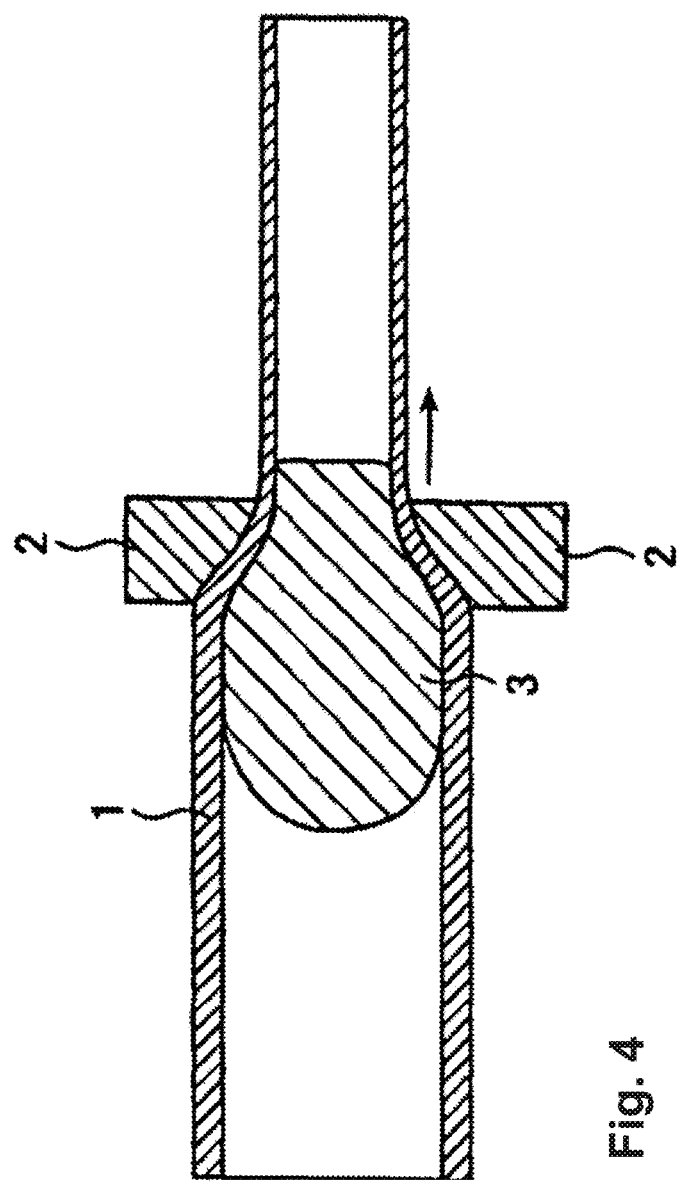

PROCESS FOR THE PRODUCTION OF THIN-WALLED HOLLOW PROFILES WHICH ARE COMPOSED OF NONFERROUS METALS AND HAVE SMALL DIAMETERS

RELATED APPLICATION

This application claims the benefit of priority from European Patent Application No. 19 306 241.1, filed on Sep. 30, 2019, the entirety of which is incorporated by reference.

FIELD OF THE INVENTION

The invention relates to the production of tubes or hollow profiles composed of nonferrous metals, in particular the continuous production of thin-walled tubes which have small diameters.

BACKGROUND

In the production of thin-walled hollow profiles or tubes having small diameters in a continuous process, a slitted hollow profile having larger dimensions, for example a slitted tube having a larger diameter, and optionally a greater wall thickness is firstly made from a flat metal strip, for example by means of appropriate rollers. The edges adjoining the slit of the metal strip which has been shaped to give the hollow profile are subsequently welded together, usually employing an electric arc welding process. Electric arc welding produces a pronounced welding bead on the inside of the tube, projecting into the interior of the tube. For this reason, the welding seam has to be smoothed or deburred on the outside and/or inside after welding, or the bead is removed by cutting machining, before the tube can be processed further. To ensure that the welding seam is uniform, it is possible to carry out a series of non-destructive tests, e.g. eddy current testing, ultrasonic testing and pressure tests.

Exactly as in the production of seamless tubes having a small diameter and/or small wall thicknesses, the welded tubes are subsequently subjected to a drawing process in which the wall thickness is reduced by means of a mandrel, plug or a spike in order to attain a smaller diameter and optionally lower wall thicknesses of the end product. In particular because of the large dimensions of the welding seam in the electric arc welding process and the resulting large minimum diameter which the welded tube has to have, a number of drawing processes with increasing degree of deformation may be necessary in order to achieve small cross sections and thinner wall thicknesses. Tube diameters below 4 mm can no longer be produced reliably by means of electric arc welding. If only the wall thickness has firstly been reduced in a first drawing process, the diameter of the tube subsequently has to be decreased. For this purpose, the tube can, for example, be drawn over a floating plug and through a drawing die. However, the reduction in the wall thickness and the diameter can also be effected in a single drawing operation. During drawing over a plug, not only is the wall thickness or the diameter reduced but the welding bead on the inside is also smoothed. A further reduction in the diameter to the desired final dimension can be achieved in one or more subsequent drawing processes, in which the plug can be dispensed with when no further decrease in the wall thickness is required. FIG. 4 shows a schematic depiction of the elements used in plug drawing. In plug drawing, a plug 3 is positioned in the interior of the tube 1 which is then drawn through an opening in a die 2 having a smaller diameter than that of the original tube and that of the plug. The plug cannot be drawn through the tube and moves relative to the tube; in actual fact it remains in front of the opening while the tube is pulled through between the opening and the plug and its diameter and its wall thickness are reduced in the process. In this operation, the tube can be preheated in addition to heating brought about by the deformation in order to increase the ductility of the material during drawing. A drawing agent which reduces the friction of the plug can be introduced into the interior of the tube. The process can be repeated a number of times with decreasing diameters. When the work hardening of the material exceeds the desired degree or the degree which the material can tolerate, an annealing step in which the drawn tubes are, before a subsequent drawing operation, degreased, heat treated and descaled and sharpened for the next drawing operation can be introduced. The annealing homogenizes the metallurgical microstructure of the tube. Since the microstructure of a tube has been destroyed after drawing, there is, in particular, accumulation of dislocations and the material becomes hard and brittle: this is referred to as work hardening or strain hardening. In order to be able to draw the drawn tubes again, the dislocations in the microstructure have to be eliminated and the residual stresses have to be dissipated so that the material is brought back to its original state. During annealing, the drawn tubes are subjected to a controlled temperature, up to 1200° C. depending on the material, and an annealing time. During this operation, the tube usually retains its shape, at least in the case of simple cross sections, but the grains in the microstructure of the tube form a normal unstressed pattern again. Depending on annealing temperature, residual stresses and microstructural defects such as dislocations are dissipated by crystal recovery, i.e. movement of dislocations, and recrystallization. The annealed tube is then softer and can be drawn further. Depending on the desired target hardness, a concluding heat treatment is not necessary for high-pressure tubes. The material thus remains in the hard-drawn state and in this way improves the mechanical properties of the tube. Both welded tubes and long seamless tubes can in this way be drawn to an annular tube shape and very long annular tubes produced.

For particular applications, tubes composed of nonferrous metals are particularly suitable. Copper or aluminium tubes can, for example, be preferably employed in heat exchangers because of the high thermal conductivity. In particular, copper tubes can also be used as electrical shields in coaxial cables or for waveguides. In heat exchangers, but also in coaxial cables, tubes having small diameters and low wall thicknesses are required, firstly to hinder heat transfer between the media as little as possible and keep the heat capacity of the tube itself small, and secondly to keep material usage and weight low. Wall thicknesses less than 0.15 mm in particular can no longer be produced reliably and with the required quality of the welding seam by means of electric arc welding. Tubes composed of nonferrous metals having wall thicknesses and diameters smaller than those mentioned accordingly must be brought to the respective desired final dimension by means of processing steps following the actual production of the tube.

It is fundamentally advantageous for individual tubes to be able, where possible, to be produced as long parts in order to allow a largely continuous production process which has to be interrupted as rarely as possible. Any subpieces required can then be cut from the long tubes, with only a small cutting residue, if any, remaining. In general, any saving on process steps is naturally advantageous in the production process.

It is therefore an object of the present invention to propose an apparatus and a process which improves existing apparatuses and processes for the production of thin-walled tubes or hollow profiles having diameters or dimensions of less than 4 mm and wall thicknesses of less than 0.15 mm.

SUMMARY OF THE INVENTION

In the process of the invention for the continuous production of thin-walled, radially closed hollow profiles which have a small cross section, a flat strip composed of a nonferrous metal, whose thickness corresponds to the wall thickness of the hollow profile to be produced, is firstly supplied. The width of the metal strip supplied preferably corresponds to the circumference of the hollow profile. If the metal strip supplied is wider than that required for the circumference of the hollow profile, or if the edges of the metal strip are not sufficiently smooth, the metal strip can be cut to size on one or two sides in a continuous process while being supplied. In the present description, the expression "hollow profiles which have a small cross section" relates to hollow profiles having cross sections or edge lengths of a few millimetres, in particular less than 4 mm. The expression "thin-walled" refers to wall thicknesses of a few tenths of a millimetre, in particular less than 0.15 mm. The term nonferrous metal is, for the purposes of the present description, used both for the metals themselves and for alloys thereof.

The metal strip present in the appropriate width is shaped in a single-stage or multistage continuous forming process to give a hollow profile which has the desired cross section. The forming process can comprise successive bending in the longitudinal direction of the strip in a plurality of stages, for example on appropriately designed rollers and profiles. The cross section can in this case be round, oval or else have any polygonal shape. After forming, the hollow profile has a region which runs in the longitudinal direction of the hollow profile and in which the edges of the metal strip adjoin one another in an abutting fashion. The abutting edges of the hollow profile are then welded to one another along the butt seam. According to the invention, welding is carried out using a laser which radiates light having a wavelength of less than 600 nm, preferably in the range from 550 to 450 nm. Wavelengths in a range below 450 nm can also be advantageously used for the purposes of the invention. The laser introduces light energy into a point in the welding region, which light energy is, on impingement on the surface of the material being welded, absorbed and converted into heat. Light in the specified wavelength ranges utilized according to the invention is absorbed very much better by many nonferrous metals even at room temperature than, for example, light in the infrared spectrum having wavelengths above about 800 nm. In actual fact, light is absorbed at wavelengths above about 600 nm so poorly by many nonferrous metals that lasers having particularly high output powers and particular cooling measures would be necessary in order to weld the nonferrous metal. In addition, the absorption at wavelengths above 600 nm is greatly dependent on the nature of the surface, while the influence of the nature of the surface decreases greatly at the wavelengths utilized according to the invention. Furthermore, rapid regulation of the energy introduced into the active welding region is necessary because of the high temperature dependence of the absorption at relatively high wavelengths in particular, which is virtually impossible to implement, so that the quality of the welding seam can fluctuate greatly. The use according to the invention of light having wavelengths of less than 600 nm produces a more stable melt bath and leads to an overall more stable process which gives, at a high energetic efficiency of the welding process, longitudinally welded hollow profiles having a high quality and produces less reject material. In addition, a pretreatment of the welding region which brings about a reduction in the reflection and thus an increase in the absorption of the laser light can be dispensed with at the wavelength below 600 nm as is utilized according to the invention. The welding region thus does not have to be, for example, roughened or preheated, and it is not necessary to apply any layer of a material which acts as "mediator" to convert the irradiated light energy into heat and transfer it to the material being welded, so that its temperature-dependent degree of absorption is moved into regions more favourable for the wavelength used, in the welding region. This eliminates the risk of parts of the material used as mediator getting into the welding seam.

The absorbed light brings about strong heating of the metal. In order to introduce sufficient energy into the material to be welded, the light has to be highly focused. A high degree of focusing is also necessary because welding is to be effected only in the contact region of the edges along the slit. Due to heat conduction within the nonferrous metal, regions directly adjoining the point of impingement of the laser beam can likewise be strongly heated and possibly melt. Especially at small cross-sectional dimensions of the hollow profiles to be produced, for example at diameters of less than 4 mm, focusing of the laser beam is therefore of great importance in order to avoid uncontrolled flowing-away of liquefied material or detachment of material. In the process of the invention, the laser beam has a diameter at the workpiece of not more than 20% of the cross-sectional dimensions of the hollow profile, preferably less than 10%. Experiments have shown that diameters of the laser beam down to 5% of the cross-sectional dimensions still make it possible to produce welding seams having good quality, but in this case further measures may be necessary, for example movement of the focus point over the welding region. In the case of a hollow profile having a diameter of 4 mm, the diameter of the laser beam can accordingly be, for example, 400 µm, preferably 200 µm or less. The term "cross-sectional dimensions" used in this description can relate to a diameter of a hollow profile, or to edge lengths. Depending on the context, the term can also relate to bending radii of edges or the like.

The high local energy density at the point of impingement of the laser beam on the workpiece brings about local melting of the material on both sides of the butt seam, so that the melts flow into one another. The material solidifies again when it is no longer struck by the laser beam and forms the welding seam. Since the hollow profile is continuously conveyed past the fixed laser, a continuous welding seam which joins the two edges is produced. In order to prevent uncontrolled flowing-away of the liquid material, which is present in a small wall thickness, the laser power introduced and the speed at which the tube is conveyed past the laser have to be matched to one another. In the case of suitable matching, smooth welding seams which require no after-working are obtained on the outside and on the inside.

In contrast to the known electric arc welding by the tungsten-inert gas process (WIG) or metal-inert gas process (MIG), which prevent reaction of the melt with the ambient air by means of the inert gas atmosphere and therefore make high seam qualities possible, nonferrous metals having material thicknesses of less than 0.15 mm can be welded flush with one another in such a way that no after-working of the welding seam, in particular on the inside of the tube, is necessary even without protective gases in the laser welding utilized according to the invention because of the better controllability of the energy input. In embodiments of the process, an inert protective gas, for example argon, can nevertheless be passed over the welding position or cover the welding position on the inside and/or outside. Use of a protective gas atmosphere can be dependent on, inter alia, the material to be welded and the thickness thereof.

Control of the energy input by the laser can be effected either by focusing on a larger target region, so that energy available acts as required on a larger or smaller area, or by appropriate back and forth movement of a particularly narrowly focused laser beam. Focusing over a larger target region can also be brought about by means of a laser profile which has a central focus point of high intensity and an annular region of lower intensity surrounding the central focus point. In this way, the welding region can be heated or cooled along a temperature profile, which can give a cleaner welding seam, and the solidification microstructure can be influenced in a targeted way. In addition, laser beams can be pulsed in a simple way, with control of the energy input occurring, for example, via the pulse duration and the pulse spacing.

Welding by means of lasers, also known as heat conduction welding, produces a smooth, rounded welding seam which no longer has to be after-worked. The energy becomes distributed outside the region in which the laser impinges into the workpiece only by conduction of heat in the case of heat conduction welding. For this reason, the seam depth is, depending on the laser power and the thermal conductivity of the material, only from a few tenths of a millimetre to about 1 millimetre. The thermal conductivity of the material limits the maximum seam depth. In general, the width of the seam is greater than the depth of the seam. When the heat cannot flow away fast enough, the temperature of the region being worked rises above the vaporization temperature, so that metal vapour arises and the welding depth increases sharply. The process then goes over into deep welding.

The direct and continuous fabrication of the tube with the desired small diameter and the desired low wall thickness has the advantageous effect of reducing the additional production steps hitherto required, with which tubes of larger diameter and higher wall thickness have to be brought to the desired end dimensions.

The high quality of the welding seam on the outside and especially on the inside of the tube produced according to the invention which has no pronounced bead of material along the welding seam due to the finely controllable energy input into the welding position makes it possible to dispense with laborious after-working, which is especially difficult to implement in the case of small tube diameters.

If the desire is for hollow profiles with even smaller wall thicknesses and/or diameters, in one embodiment the hollow profile produced according to the invention can be subjected to a reducing or drawing operation. Because the production process according to the invention does not have a bead of material along the weld seam, there is no need in the reducing or drawing operation for the internal tool that is normally needed. As well as the cost reduction from the absence of one tool part, there are also no costs for cleaning the tube interior after the reducing or drawing, since no drawing agents or lubricants have to be introduced into the tube interior.

In one or more embodiments of the process, the width of the strip supplied is measured and a cut width is provided as a function of the measurement result and a prescribed value. The width corresponds approximately to the circumference of the hollow profile along the neutral fibre. Here, the prescribed value can be varied and a forming apparatus can be controlled as a function of the varying width of the strip, for example to adapt the amount of material required for the welding seam or the formation of a welding bead.

In embodiments of the process, a temperature profile is measured transverse to the welding seam. The measured temperature profile can be utilized for controlling the energy introduced into the welding point. The measured temperature profile can, for example, be compared with a prescribed profile and the control of the energy introduced can encompass variation of the focus diameter, a locus described by the focus point on the material being welded and/or a change in the pulse duration and/or the pulse spacing of the laser beam. It is likewise conceivable to regulate the supply speed as a function of the measured temperature profile. The measured temperature profile can also be stored for quality management and documentation purposes.

In embodiments of the process, the welding seam is checked by means of ultrasound, X-rays, an eddy current measurement or other non-destructive measurement methods. The results of the check can, for example, be utilized for controlling the energy introduced into the welding position and/or the supply speed.

In embodiments of the process, a tensile force acting on the flat strip of nonferrous metal and/or on the welded hollow profile is determined and drives which feed the flat strip to forming and/or welding and/or feed the welded hollow profile to an uptake apparatus are regulated on the basis of the previously determined tensile force. A tensile force which is too high can, especially in the case of supplied strips having a very small thickness, lead to tearing of the strip, which would interrupt the process. An analogous situation applies to the tensile force acting on the welded hollow profile.

One or more of the embodiments of the process may be followed by the application of a reducing or drawing operation to the welded hollow profile to achieve a further reduction in the diameter and/or wall thickness of the hollow profile. In the subsequent reducing or drawing operation, diameter reduction is achieved with just an outer tool, since the welding according to the invention generates a weld seam which removes the need for an internal tool for smoothing the bead.

An apparatus according to the invention for the continuous production of thin-walled, radially closed hollow profiles which are composed of nonferrous metals comprises a feed device equipped for supplying a flat strip of the nonferrous metal. The feed device can, for example, comprise a holder for a flat strip of the nonferrous metal wound up on a reel or in the form of a coil. The strip is wound off from the reel and fed to a forming apparatus which forms the flat strip of nonferrous metal into the profile of the hollow profile so that the opposite edges of the flat strip of the nonferrous metal abut one another in a flush manner. The forming apparatus can, for example, comprise a plurality of rollers and profiles, for example drawing dies, which form the strip to give the desired hollow profile during passage in the longitudinal direction. The forming apparatus can additionally have two or more guide means which are at a distance from one another in the longitudinal direction of the formed strip or hollow profile, between which guide means the edges are held flush against one another at a position to be welded. The strip can optionally be guided at the sides at one or more points before and in the tool in order to minimize sideways movement of the strip.

The apparatus further comprises a welding apparatus which welds together the edges resting flush against one another between the guide means. The welding apparatus comprises a laser which emits light having a wavelength of less than 600 nm with an energy which brings about local melting of the nonferrous metal at both sides of the edges. As a result of the continuous advance of the formed and welded hollow profile, regions in which the material has been melted are moved out from the region in which the laser heats the material and the molten material solidifies again. The energy introduced into the material in order to heat it is matched to the material, the thickness thereof and also the speed at which the hollow profile is conveyed past the welding position, so that although the material is melted in a region located directly at the edges resting flush against one another, no liquid material runs into the interior of the hollow profile. The distance between optics of the laser and the edges of the hollow profile to be welded can be kept constant by means of the guide means. In order to keep the position of the adjacent edges constant relative to the optics of the laser, a "sword" can be arranged in the longitudinal slit located between the edges before the guide means which close the longitudinal slit in order to prevent helical twisting.

The apparatus additionally comprises one or more transport devices which convey the welded hollow profile further to an uptake device which takes up the hollow profile. The transport device can comprise, for example, one or more clamping tong offtakes, cleat offtakes, disc offtakes or belt offtakes of known construction type, with different transport devices also being able to be combined with one another.

In one or more embodiments of the apparatus, a measurement apparatus for determining the tensile force is provided upstream of the forming apparatus. The tensile force determined can be supplied as actual value to a regulator and used together with an intended value for regulating the drives of the apparatus, for instance in order to regulate the speed at which the strip of nonferrous metal is supplied. In addition, a measurement and/or regulating apparatus can be arranged downstream of the welding device in order to measure the tensile force exerted on the welded hollow profile and/or regulate the drive of the transport device which feeds the welded hollow profile to the uptake device. Regulation of the tensile force between the transport device and the uptake device can, for example, be effected by means of a dancer which measures a sag of the welded hollow profile and feeds corresponding signals to a drive control of the uptake device.

In one or more embodiments, the apparatus additionally comprises a cutting device arranged upstream of the forming device, by means of which one or both edges of the flat strip of nonferrous metal supplied are cut, with the width of the cut strip corresponding to the circumference of the hollow profile. In these embodiments, hollow profiles having different circumferences can be produced without great difficulty by cutting the metal strip supplied to the required width and adapting the further tools of the apparatus.

Pieces cut off at one or both edges of the strip can, in one or more embodiments, be fed to an apparatus for accommodating cutting scrap.

In one or more embodiments of the apparatus equipped with a cutting device, a measurement device for measuring the width of the strip which has been cut to size is provided downstream of the cutting device. The cutting device can be controlled with the aid of the measured values in order to maintain a desired width of the nonferrous metal strip over a long period of time. The cutting device can be supplied with appropriate prescribed values with which the measured width of the nonferrous metal strip is compared in order to generate a control signal for adjusting the cutting device. The width corresponds approximately to the circumference of the hollow profile along the neutral fibre.

The welding apparatus can be configured, even in the case of slow supply speeds of the nonferrous metal strip, to weld the edges with the required quality.

In one or more embodiments, the apparatus additionally comprises a measurement device for determining a temperature profile transverse to the welding seam. The measured temperature profile can be supplied to the welding apparatus in order to control the energy given off, or to the feed device and/or the transport device in order to control the supply speed.

In one or more embodiments, the apparatus additionally comprises a measurement device for measuring at least one dimension of the hollow profile after welding. This measurement device can be used for integrated quality control, exactly like a measurement device provided in one or more embodiments for checking the welding seam and/or material defects or inhomogeneities in the material. The dimensions can preferably be measured in a contactless manner, for example by means of lasers.

In one or more embodiments, there is a corrugator between the welding apparatus and the receiving device to form the welded hollow profile into a corrugated tube with parallel or helical corrugation. This corrugator in one or more embodiments may be set up to provide sections of the tube selectively with the corrugated profile, and leave other sections unprofiled.

Corrugated regions arranged at fixed distances from one another along the hollow profile can be advantageous for producing tubes for heat exchangers. The smooth sections can be located in the heat exchanger, for example be welded to sheet-like elements or rest flush against them in a thermally coupled manner, which increase the effective surface area of the heat exchanger, while the tubes in the corrugated regions are bent in order to allow a serpentine configuration of the tubes at or in the sheet-like elements. Bending of, in particular, very thin-walled tubes frequently leads to undesirable kinks and the undesirable profile narrowing associated therewith; in addition, the freedom from leaks of a tube can no longer be ensured at the position of a kink. A supporting of the inside of the tube which is frequently utilized in the bending of thin-walled tubes is not useable in the continuous production according to the invention of the tube. However, thin-walled tubes can be bent in a defined manner in the corrugated regions without changing the cross section in an uncontrolled way. Since the tubes together with the corrugated regions can be produced continuously in one production operation, the connection of straight tube sections to curved tube sections by means of which a change in direction is achieved, as has been hitherto necessary, can be dispensed with.

The corrugation can also be provided in straight sections, for example to influence flow conditions of a fluid flowing in the hollow profile or in order to increase the surface area available for heat transfer.

In one or more embodiments, welding is preceded by the insertion, into the hollow profile, of a conductor clad with electrical insulation—for example, during the forming operation before the edges of the nonferrous metal strip are lastly brought together. This enables, for example, the continuous production of long coaxial conductors. The coaxial conductor produced in this way may also be fed to a corrugator after welding of the hollow profile, to form a flexibly layable coaxial cable. After passage through the corrugator, the corrugated coaxial cable can be sheathed with electrical insulation, by surround injection or by wrapping, for example.

Hollow profiles having wall thicknesses below 0.15 mm and diameters or dimensions smaller than 4 mm can be produced in high quality in a simple way by means of the above-described process in which laser light having wavelengths of less than 600 nm is utilized for welding thin-walled nonferrous metal sheets, without complicated afterworking. The use of focus diameters of the laser beam of less than 400 μm in the continuous welding ensures a sufficiently small heat influence zone relative to the dimensions of the hollow profile, so that no detachment of material occurs and a welding seam which does not have a pronounced bead on the inside of the tube is produced. Owing to the direct production of the hollow profile from nonferrous metal strips having a small wall thickness, subsequent drawing of the tube can be dispensed with.

If even smaller diameters are needed, an internal element, such as a mandrel, stopper or arbor, can be omitted in the subsequent drawing of the tube. Dispensing with the internal tools then results at least in lower costs; complexity and costs for cleaning the tools and the hollow profile are also greatly reduced, since no drawing agent is needed inside the tubes. Without a drawing process subsequent to welding, copper tubes having a Ø of 2.0 mm and a wall thickness of 0.10 mm can already be produced at welding speeds of greater than 6 m/min by means of the above-described process, with the welding seam quality being able to be kept constant over a number of hours.

The high welding seam quality resulting from the process of the invention makes possible tensile stresses perpendicular to the welding seam which is equal to the strength values of the base material. This allows application of pressure of the same magnitude as in the case of seamless stress-free annealed tubes of identical diameters and wall thicknesses.

BRIEF DESCRIPTION OF THE DRAWING

The invention will be illustrated below by way of example with the aid of an embodiment with reference to the accompanying figures. All figures are purely schematic and not true to scale. The figures show.

Identical or similar elements are denoted by identical or similar reference numerals in the figures.

DETAILED DESCRIPTION

Figure 1:
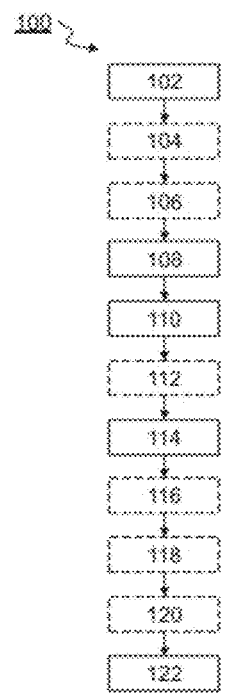
FIG. 1 an illustrative example of the process of the invention for the continuous production of thin-walled, radially closed hollow profiles, FIG. 2 an illustrative example of an apparatus according to the invention for the continuous production of thin-walled, radially closed hollow profiles, FIG. 3 pictures of a welding seam of a hollow profile produced by the process of the invention and FIG. 4 a schematic depiction of a process known from the prior art for reducing the wall thickness and the diameter of a tube.

FIG. 1 shows steps of a process 100 for producing thin-walled, radially closed hollow profiles according to one aspect of the invention. In step 102 of the process a flat strip composed of nonferrous metal is fed at a first supply speed to a forming apparatus. For example, a flat copper strip is rolled off from a coil. In the forming apparatus, the flat strip supplied is formed in step 108 to give a shape corresponding to the desired hollow profile, for example a round tube or a quadrilateral tube. Forming can, for example, be carried out by means of a roll-forming tool.

Before forming, an optional step 104 in which one or both edges of the strip of nonferrous metal are cut or prepared in another way can be carried out in a cutting device. In this way, the width of the strip can be set uniformly and precisely even in the case of poor edge quality of the strip of nonferrous metal and the edges can optionally be prepared for the subsequent welding operation. The cutting device can be supplied with measured values from a measurement apparatus which determines the width of the nonferrous metal strip after cutting to size.

In the forming operation, the edges of the strip are conveyed by means of guide elements so that twisting before welding is prevented and the flush adjacent edges are conveyed in a defined position and at a defined spacing past a welding apparatus. The guide elements can, for example, comprise one or more guide swords and guide bushings which are matched to the hollow geometry to be manufactured. The closing of the geometry can, for example, be carried out by means of drawing dies.

After forming, two opposite edges of the flat strip are located flush against one another in a contact region. In step 110, the flush adjoining edges in the contact region are welded to one another continuously. Welding is carried out by means of a laser which emits light having a wavelength of less than 600 nm. Blanketing of the welding seam by protective gas can optionally be carried out from the outside and/or inside of the hollow profile, depending on the required welding seam quality.

After welding, the now radially closed hollow profile is taken off from the welding region, step 114, and in step 122 is fed to an uptake device for accommodation. Taking-off is effected by means of a transport device, for example by means of a clamping tong offtake, cleat offtake or belt offtake.

To monitor the quality of the welding seam, the temperature profile transverse to the welding seam can be determined in an optional step 112. The temperature profile determined can be supplied to a control device for the laser and other elements of an apparatus implementing the process, in particular one or more drives which regulate the supply speed of the strip of nonferrous metal or the speed at which the welded hollow profile is taken off from the welding region.

The process can optionally also comprise a determination of the tensile force on the strip before forming, step 104, and/or on the hollow profile after welding, step 120. The tensile force determined can likewise be supplied to the one or more drives as measured parameter for regulation.

The process can additionally comprise an optional step 116 in which one or more dimensions of the welded hollow profile are determined. The dimensions determined can first and foremost be supplied as input variables for regulating the forming operation and the cutting operation for adjusting the width of the strip.

The process can additionally comprise an optional step 118 in which the quality of the welded seam and/or the welded material is checked for material defects in a nondestructive manner, for example by means of eddy current testing, ultrasound or X-rays.

Drawing or rolling operations subsequent to the process, by which the weld seam surface is made even more uniform or smoothened, are not shown in the figure. Nor does the figure show subsequent drawing operations for reducing the diameter of the hollow profile, or operations whereby corrugation is made in the hollow profile or the hollow profile is cut into subpieces.

Figure 2:
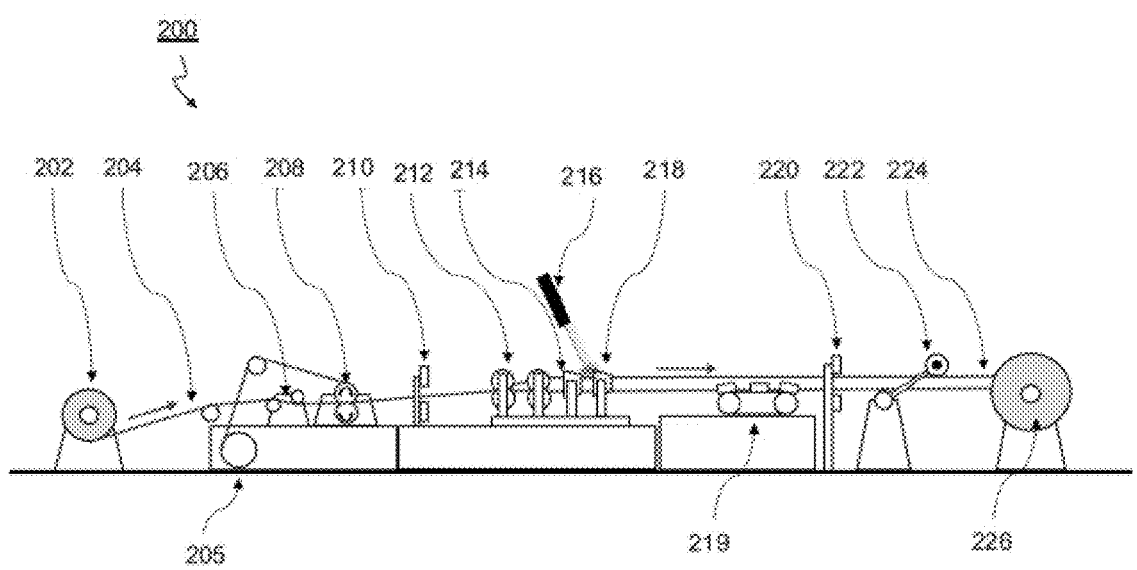

FIG. 2 shows an illustrative example of an apparatus according to the invention for the continuous production of thin-walled, radially closed hollow profiles. A thin strip 204 of nonferrous metal, for example a copper strip, is rolled off from a roll or unwinder 202. The strip 204 is fed to a roll-forming tool 212 by means of which it is brought to the shape of the desired hollow profile, for example shaped to give a longitudinally slitted round or quadrilateral tube. A cutting apparatus 208 which cuts the strip 204 to a required width or cuts one or both edges of the strip 204 to give clean and smooth edges can be provided between the roll or unwinder 202 and the roll-forming tool 212. An uptake apparatus 205 can be provided for accommodating offcuts of the strip 204. The width of the strip 204 which has been cut to size can be checked in a strip width measurement apparatus 210. The measured results can be supplied to the cutting device 208 for the purposes of regulation. In addition, a measurement apparatus 206 for determining the tensile force, the measured values from which can, for example, be used for regulating drives of the apparatus, can be arranged between the roll or unwinder 202 and the roll-forming tool 212. The edges of the strip located next to one another after forming of the hollow profile can be conveyed by means of one or more guide elements 214 before the laser welding apparatus 216 in such a way that twisting of the hollow profile before welding is prevented and the distance underneath optics of the laser welding apparatus 216 is adhered to. The guide elements can comprise one or more guide swords and guide bushings matched to the hollow profile. The geometry of the hollow profile to be welded is closed by means of drawing dies or guide bushings 218, so that the edges of the strip 204 which has been shaped to give the hollow profile rest against one another in the region of the laser welding apparatus 216. The laser welding apparatus 216 emits high-energy light at a wavelength of less than 600 nm, preferably in a range from 550 to 450 nm. Wavelengths in a range below 450 nm can also be advantageously used according to the invention. The welding region can be blanketed with a protective gas, for example argon, within or outside the hollow profile via a protective gas facility, which is not shown in the figure, in order to prevent reactions of the material being welded with the atmosphere. The advance of the welded hollow profile 224 is effected by means of a transport device 219. The transport device 219 can, for example, comprise one or more clamping tong offtakes, cleat offtakes, disc offtakes or belt offtakes, or combinations thereof. Before winding of the welded hollow profile 224 onto a winder 226, one or more dimensions of the hollow profile 224 can be determined by means of a measurement instrument 220, preferably in a contactless manner. To determine the tensile forces acting on the hollow profile 224, a further tensile force measurement apparatus 222 can be provided before the winder 226.

Figure 3:
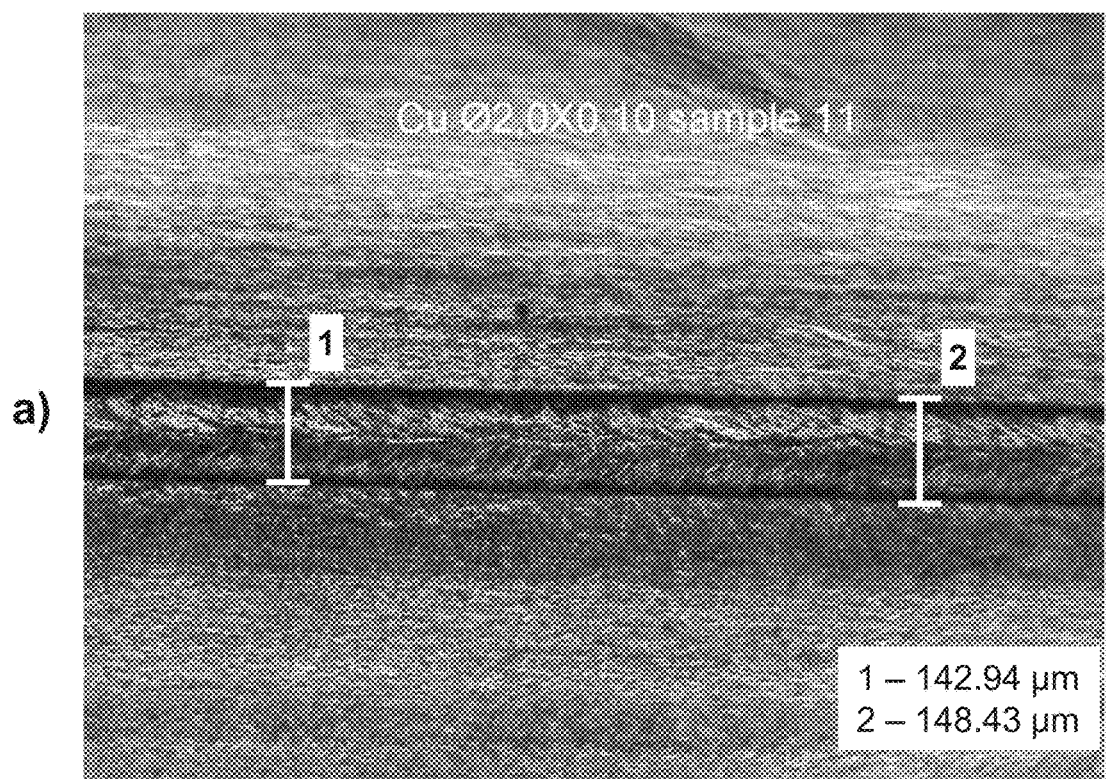
Figure 3:
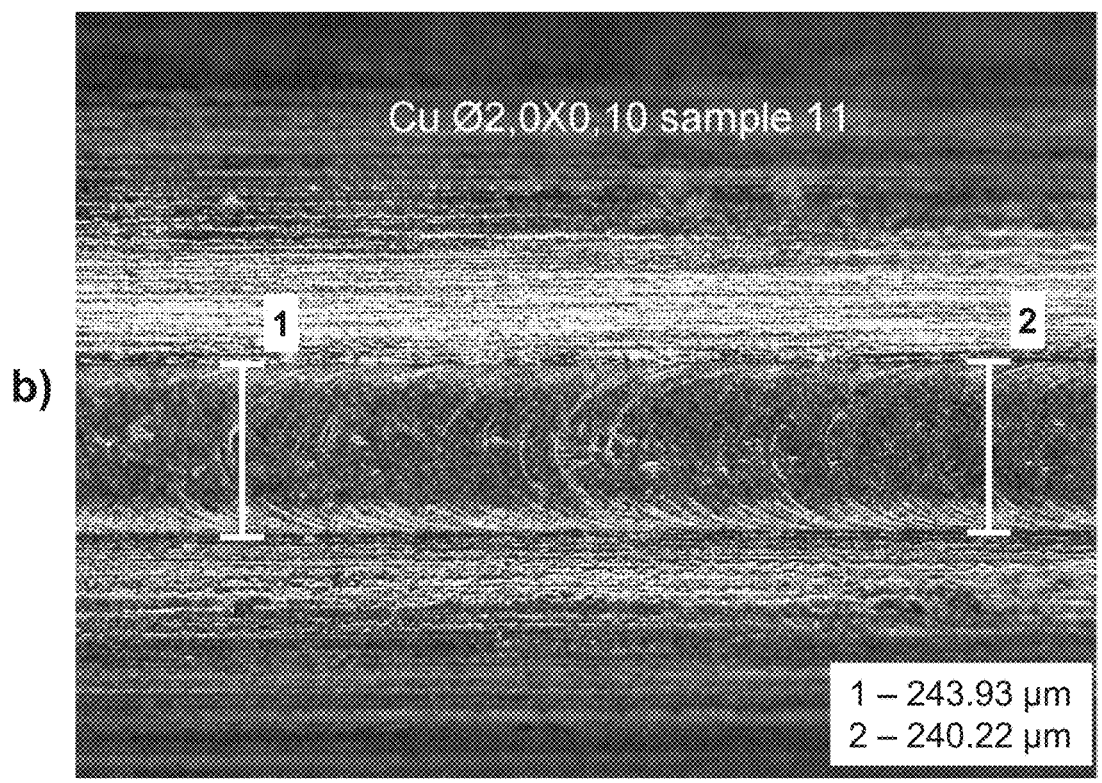

FIG. 3 shows pictures of a welding seam of a hollow profile produced by the process of the invention. The hollow profile is a copper tube which has a diameter of 2 mm and a wall thickness of 0.1 mm and has been formed and welded continuously at an advance speed of 6 m/min from a copper strip. The welding position has been blanketed with argon on the inside and outside. FIG. 3a) shows the welding seam on the outside of the hollow profile, which has a width in the range from 140 to 150 μm. FIG. 3b) shows a photograph of the inside of the hollow profile, in which the welding seam has a width of about 242 μm. It can readily be seen that the welding seams are very uniform both on the inside and the outside, so that after-working would not be necessary for most applications. A section of the tube produced by the process was subjected to a pressure test and withstood pressures of more than 200 bar.

FIG. 4, which shows a schematic depiction of a process known from the prior art for reducing the wall thickness and the diameter of a tube, has been described further above in relation to the prior art.

LIST OF REFERENCE NUMERALS

1 Tube
2 Die
3 Plug
100 Process
102 Supply of strip
104 Determination of tensile force
106 Cutting of edges
108 Shaping of hollow profile
110 Welding
112 Determination of temperature profile
114 Taking-off of hollow profile
116 Determination of dimensions
118 Determination of quality
120 Determination of tensile force
122 Feeding to uptake device
200 Apparatus
202 Roll/unwinder
204 Strip of nonferrous metal
205 Uptake apparatus for cutting scrap
206 Tensile force measurement apparatus
208 Cutting device
210 Strip width measurement apparatus
212 Roll-forming tool
214 Guide element
216 Laser welding apparatus
218 Drawing die/guide bushing
219 Transport device
220 Measuring instrument
222 Tensile force measurement apparatus
224 Welded hollow profile
226 Winder

The invention claimed is:

1. A process for the continuous production of radially closed hollow profiles having a wall thickness of less than 0.15 mm and a diameter smaller than 4 mm and which are composed of nonferrous metals, comprising:
   supply of a flat strip of the nonferrous metal at a first supply speed to a forming apparatus, where the thickness of the flat strip corresponds to the wall thickness of the radially closed hollow profile to be produced,
   continuous forming of the flat strip supplied into a shape corresponding to the radially closed hollow profile, where two opposite edges of the flat strip rest flush against one another in a contact region extending in the longitudinal direction of the radially closed hollow profile after forming,
   continuous welding of the edges resting flush against one another in the contact region without prior treatment to reduce reflections, where the edges to be welded are conveyed at the first supply speed past a welding region which is fixed in relation to an apparatus implementing the process, wherein an area in the welding region is heated by means of a laser which emits light having a wavelength of less than 600 nm and the heated area has a diameter which is less than 20% of the cross-sectional dimension of the radially closed hollow profile, taking-off of the welded radially closed hollow profile from the welding region, determining of a longitudinal tensile force on the flat strip of the nonferrous metal and/or the welded radially closed hollow profile, regulating a drive which supplies the flat strip and/or a drive which supplies the welded radially closed hollow profile to forming, and/or a drive which supplies the welded radially closed hollow profile to welding and/or a drive which supplies the welded radially closed hollow profile to taking-up in an uptake apparatus, and taking-up of the welded radially closed hollow profile in an uptake device.

2. The process according to claim 1, wherein an inert protective gas flows around or blankets at least the welding region on an inside and/or an outside of the radially closed hollow profile during heating.

3. The process according to claim 1, additionally comprising:

cutting to size of one or two edges of the flat strip of the nonferrous metal before forming.

4. The process according to claim 3, additionally comprising:

measuring the width of the strip of the nonferrous metal which has been cut to size before welding and/or measuring at least one dimension of the radially closed hollow profile after welding and regulating a cut width and/or controlling an apparatus for forming as a function of the measurement result and a prescribed value.

5. The process according to claim 1, additionally comprising:

measuring a temperature profile transverse to the welding seam and controlling of the energy introduced into the welding region as a function of a comparison of the temperature profile with a prescribed profile.

6. The process according to claim 1, additionally comprising:

checking of the welding seam by means of ultrasound, eddy current measurement and/or X-rays.

7. The process according to claim 1, additionally comprising:

reducing or drawing the welded radially closed hollow profile, for reducing one or more cross-sectional dimensions and/or the wall thickness of the radially closed hollow profile, wherein only an outer tool is used in for reducing or drawing.

* * * * *